United States Patent [19]
Hansen

[11] Patent Number: 5,779,228
[45] Date of Patent: Jul. 14, 1998

[54] ANTI-SLIP HAND RAIL

[76] Inventor: Randall C. Hansen, 6 Old Mill Ct., Columbia, S.C. 29206

[21] Appl. No.: 704,884

[22] Filed: Aug. 3, 1996

[51] Int. Cl.⁶ .................................................. E04F 11/18
[52] U.S. Cl. .................................. 256/65; 256/59; 362/146
[58] Field of Search .................... 256/65, 59; 362/146

[56] References Cited

U.S. PATENT DOCUMENTS

| | | |
|---|---|---|
| Re. 21,143 | 7/1939 | Davis. |
| 1,329,487 | 2/1920 | West. |
| 1,769,326 | 7/1930 | Weis. |
| 1,969,958 | 8/1934 | Alder. |
| 2,490,854 | 12/1949 | Bozoti. |
| 2,512,203 | 6/1950 | Fluharty. |
| 2,644,954 | 7/1953 | Jumper. |
| 2,817,095 | 12/1957 | Jeffries. |
| 2,914,284 | 11/1959 | Tisdall. |
| 2,956,767 | 10/1960 | Unetic. |
| 3,071,350 | 1/1963 | Opie. |
| 3,370,389 | 2/1968 | Macaluso. |
| 3,569,689 | 3/1971 | Nestrock .................. 362/146 |
| 3,637,084 | 1/1972 | Uitz. |
| 3,784,023 | 1/1974 | Varon et al. |
| 3,825,229 | 7/1974 | Bartlett et al. |
| 3,842,564 | 10/1974 | Brown. |
| 4,002,322 | 1/1977 | Matsubara. |
| 4,142,343 | 3/1979 | Trafton. |
| 4,161,769 | 7/1979 | Elliott ....................... 362/146 |
| 4,194,338 | 3/1980 | Trafton ..................... 256/65 X |
| 4,200,261 | 4/1980 | Bartlett. |
| 4,353,529 | 10/1982 | Brown. |
| 4,523,734 | 6/1985 | Grohe. |
| 4,653,714 | 3/1987 | Andrasko, Jr. |
| 4,700,918 | 10/1987 | Andrasko, Jr. |
| 4,895,332 | 1/1990 | Hansen et al. ............ 256/59 X |
| 5,025,352 | 6/1991 | Brown. |
| 5,297,010 | 3/1994 | Camorota et al. |
| 5,396,740 | 3/1995 | Bocchi ...................... 256/65 X |
| 5,422,794 | 6/1995 | Drake ........................ 362/73 |

FOREIGN PATENT DOCUMENTS

| | | | |
|---|---|---|---|
| 6322919 | 11/1994 | Japan | ........... 256/59 |

*Primary Examiner*—Anthony Knight
*Attorney, Agent, or Firm*—Dority & Manning, P.A.

[57] ABSTRACT

A vehicle hand rail assembly is provided having an elongated bar. A first section of the bar defines a gripping area, and a second section of the bar is configured to receive and retain at least one light element longitudinally disposed along the bar. At least one mounting member secures the bar in position with respect to a surface of the vehicle.

22 Claims, 3 Drawing Sheets

ANTI-SLIP HAND RAIL

BACKGROUND OF THE INVENTION

The present invention relates to an anti-slip hand rail and, in particular, to illuminated hand rails adapted for use on trucks, emergency vehicles, and other vehicles.

Vehicle hand rails are typically used as aids to entry and exit from doorways and are normally secured to the vehicle in close proximity to an entry or cargo door. Hand rails should resist both pulling and torsional forces and should provide an effective grip for a user's hand. An anti-slip hand rail having elastomeric inserts is disclosed in U.S. Pat. No. 4,895,332, the disclosure of which is fully incorporated herein by reference.

Hand rails have been illuminated at either end to aid in locating the handle in the dark and to provide a light source to assist in the entry of the vehicle. It is also known to construct a handle from an illuminated acrylic tube used as a light pipe.

OBJECTS AND SUMMARY OF THE INVENTION

The present invention recognizes and addresses disadvantages of prior art constructions and methods.

Accordingly, it is an object of the present invention to provide an improved illuminating hand rail for vehicles.

It is also an object of the present invention to provide a rail with longitudinal lighting capable of indicating location of the handle and providing warning and safety lighting.

It is a further object of the present invention to provide a hand rail having a secure mounting system which permits the rail to be positioned in a plurality of rotational positions.

It is also an object of the present invention to provide a reliable grip when the rail is utilized as a hand hold.

Additional objects and advantages of the invention will be set forth in part in the following description, or may be obvious from the description, or may be learned through practice of the invention.

The objects of the invention are achieved by a vehicle hand rail assembly comprising an elongated bar. A first section of the bar defines a gripping area. A second section of the bar defines a longitudinal cavity configured to receive and retain at least one light element longitudinally disposed along the bar. At least one mounting member secures the bar in position with respect to a surface of the vehicle.

In a preferred embodiment, the rail includes a rigid elongated bar defining two longitudinal outer cavities and an elastomeric insert disposed in each cavity extending transversely outwardly at least to a location proximate an exposed surface of the bar. The inserts form gripping areas disposed so as to be contacted by the hand of a user who has gripped the hand rail. The lighting section includes a light element within a cavity in the bar which protects the light element and prevents the element from interfering with the grip of a user.

In another preferred embodiment, two mounting members are affixed to the outer wall of the vehicle proximate an entry door. The rail bar and mounts are interlocked by means of a multi-sided key in each mount received by a corresponding cavity in the bar. The keys and their corresponding cavities are configured to cooperate to retain the bar in three selectable rotational positions.

Preferably, the lighting section includes at least one longitudinal cavity configured to receive at least one light element. Although a single element may be employed, multiple lights may be stacked in a single cavity.

The longitudinal lighting illuminates both the vehicle and the hand rail, thereby enhancing distance recognition of the vehicle and enabling an operator to quickly and accurately locate the rail. Depending on the location of the rail, the light may also help an operator locate the vehicle's lock and door handle.

Accordingly, the hand rail of the present invention provides an effective longitudinal lighting which may be positioned to a desired direction while at the same time providing an effective gripping area.

The accompanying drawings, which are incorporated in and constitute part of the specification, illustrate preferred embodiments of the invention and, together with the description, serve to explain the principles of the invention.

BRIEF DESCRIPTION OF THE DRAWINGS

A full and enabling disclosure of the present invention, including the best mode, directed to one of ordinary skill in the art is set forth in the specification, which makes reference to the appended drawings, in which.

Figure 1:
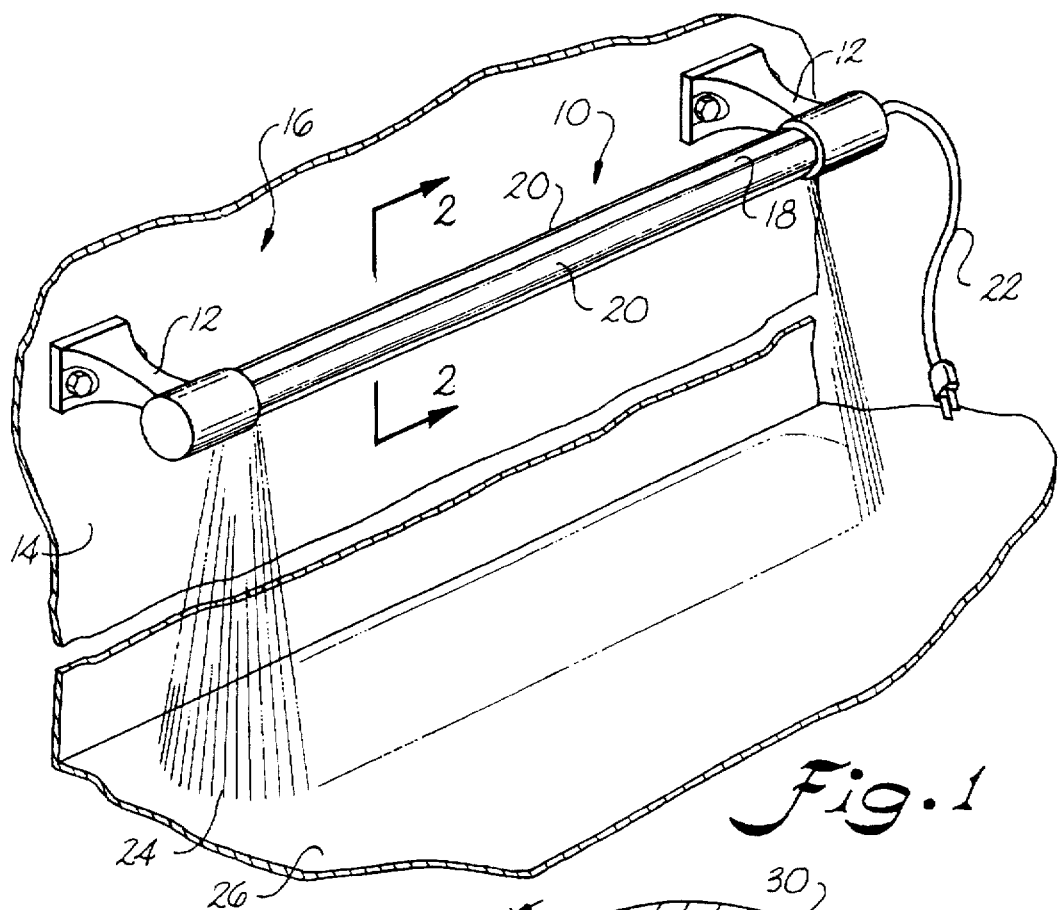
FIG. 1 is a partial perspective view of a vehicle including a hand rail assembly constructed in accordance with the present invention mounted on a vertical wall of the vehicle at a desired location.

Repeat use of reference characters in the present specification is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention, without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention is concerned with an improved vehicle hand rail. Accordingly, FIG. 1 illustrates a hand rail assembly 10, including an elongated bar 18 extending between a pair of brackets 12 mounted to wall 14 of a vehicle 16. The bar includes a pair of elastomeric members 20 extending longitudinally along the bar to aid a user's grip. Bar 18 includes a cavity to receive a light element (FIGS. 2 and 3) for lighting an area on or about vehicle 16. An electrical cord 22 provides power to the lighting element through one of the brackets 12. While power may be provided by the vehicle's electrical system, it should be understood that other manners of energizing the lighting element are possible. For example, assembly 10 may include or receive power from a battery.

While assembly 10 is shown in FIG. 1 in a horizontal position, it should be understood that various suitable orientations are possible, depending upon the requirements of the vehicle. The assembly may be placed, for example, near vehicle doors, cargo areas, or other areas requiring operator access.

Figure 4:
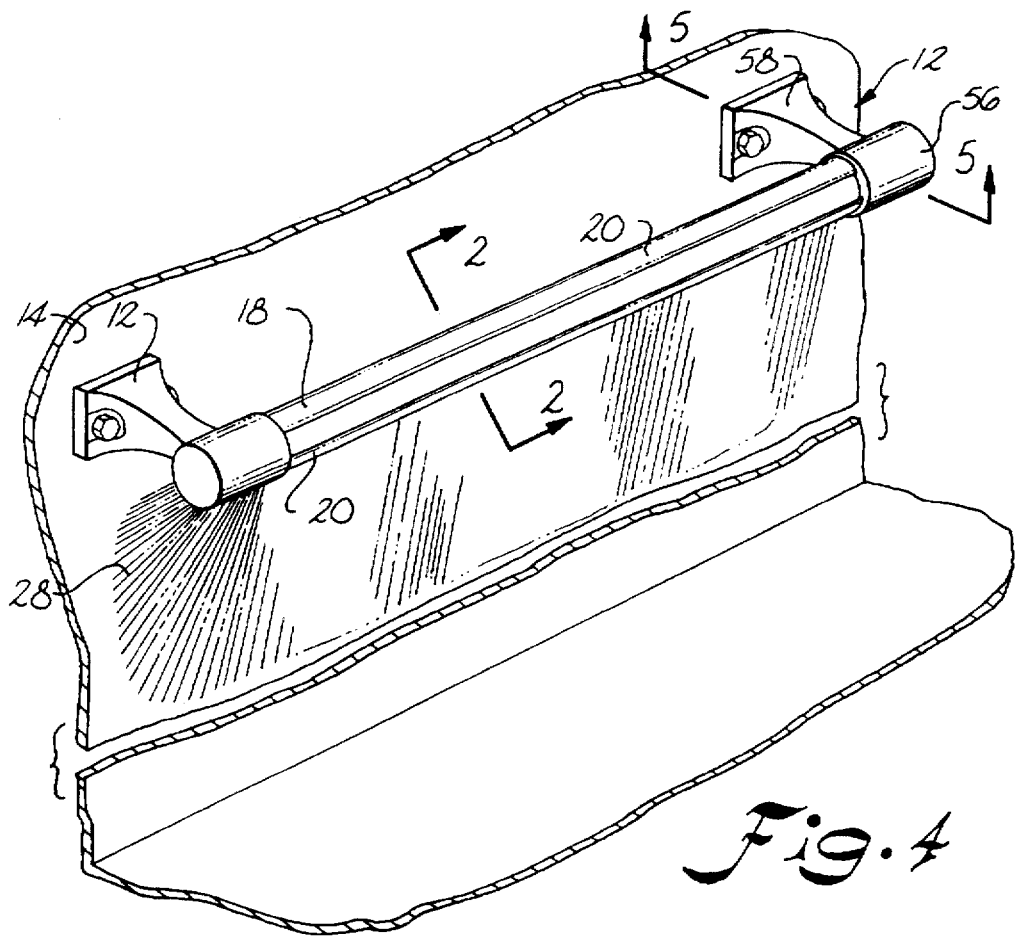
FIG. 4 is a partial perspective view of a vehicle including a hand rail assembly constructed in accordance with the present invention mounted on a vertical wall of the vehicle at a desired location.

Furthermore, bar 18 is rotatable to a plurality of rotational positions, enabling an operator to selectively direct light from the assembly to a desired area. For example, bar 18 in FIG. 1 is positioned so that light is directed to an area 24 of a surface 26, which may be, for example, a step or work surface. As shown in FIG. 4, bar 18 is rotated to a position such that the light is directed inward to an area 28 of wall 14. This configuration is particularly useful, for example, near doors or cargo areas.

Figure 2:
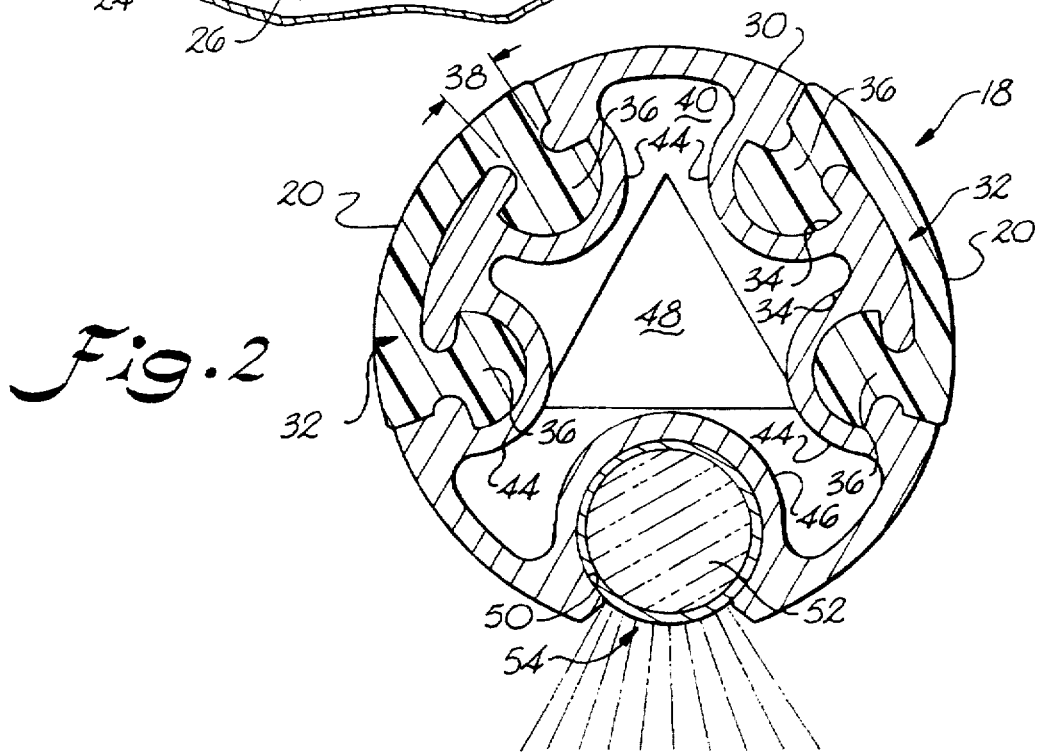
FIG. 2 is a partial cross-sectional view of a hand rail/assembly according to the present invention taken along the lines 2—2 of FIGS. 1 and 4.

Referring now to FIG. 2, a cross section of bar 18 is illustrated along the line 2—2 of FIGS. 1 and 4. Elastomeric members 20, such as those disclosed in the above-referenced U.S. Pat. No. 4,895,332, extend slightly beyond the exposed surface 30 of bar 18 to form part of a gripping area to be contacted by the hand of a user. Although the elastomeric members are disposed symmetrically about the bar, it should be understood that various configurations are possible. For example, any suitable number of elastomeric members of various suitable shapes and constructions may be employed. Moreover, outer surface 30 of bar 18 may itself form part or the entirety of the gripping area when no elastomeric members are included. Outer surface 30 may be smooth or may have a textured surface to aid the grip of a user's hand. Thus, at least part of outer surface 30 may form a gripping area, alone or in conjunction with the surface of one or more elastomeric member.

Furthermore, although members 20 are described herein as being constructed from elastomeric material, it should be understood that various suitable constructions may be employed. For example, the members may be made from plastic or wood, depending upon the circumstances and the vehicle upon which the assembly is to be used.

Each elastomeric member 20 is received by a cavity 32 including a pair of parallel longitudinal grooves 34 receiving flanges 36 of members 20. Each groove 34 forms a restricted opening 38 that holds its respective flange 36 in place in the radial direction.

Bar 18 may be constructed from a metallic, such as aluminum, extrusion and may have a solid interior. The bar may be constructed in various suitable sizes and may, for example, have a diameter ranging from 0.75 inches to 2.0 inches. One preferable construction includes a bar diameter of about 1.25 inches and a length of 4 feet or less. As illustrated in the figures, bar 18 defines a generally circular cross section. Although the bar may define elevated portions or ridges, for example at the gripping surfaces, the bar cross section approximates a circle.

Figure 3:
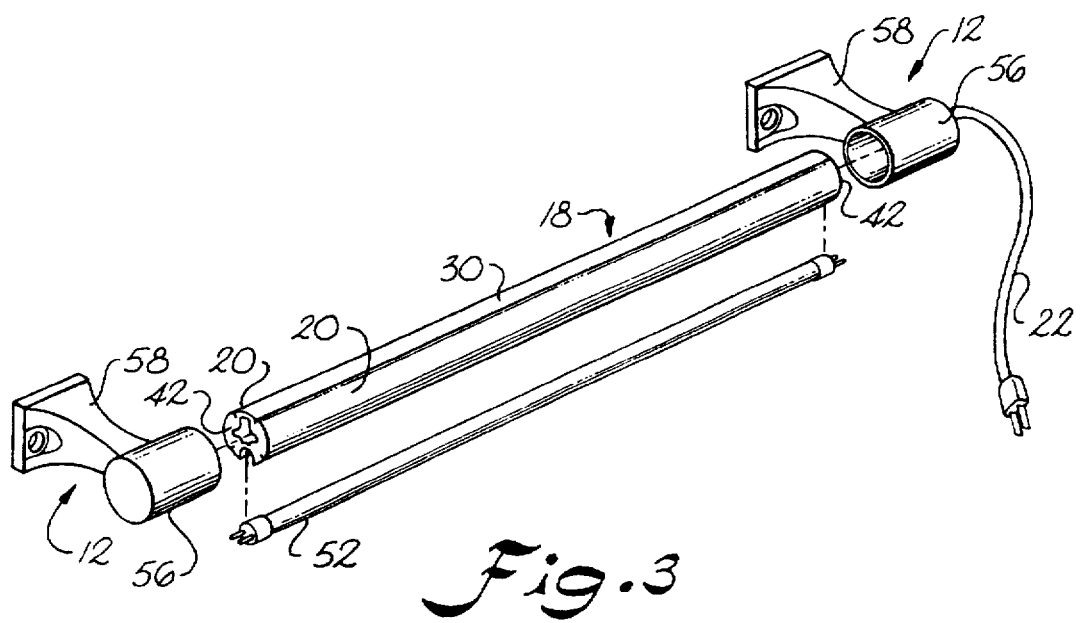
FIG. 3 is an exploded perspective view of the hand rail assembly depicted in FIG. 1.

In the embodiment as shown in FIG. 2, bar 18 defines an inner cavity 40 extending longitudinally between end faces 42 (FIG. 3). The shape of inner cavity 40 depends on the configuration of interior side walls 44 and 46. The side walls permit cavity 40 to receive a triangular key, indicated at 48 in FIGS. 2 and 5, from each bracket 12 to secure bar 18 in a desired rotational position. The triangular shape of the key 48, in cooperation with the side walls 44 and 46, permits three possible rotational positions. It should be understood, however, that all suitable configurations are within the scope of the present invention. Thus, for example, key 48 and side walls of interior cavity 40 may have various suitable shapes and configurations.

Bar 18 also defines a longitudinal cavity 50 to receive a light element 52. Cavity 50 defines a restricted opening 54 to retain light element 52 in the radial direction. Opening 54 may be covered by a lens to protect element 52 and/or to color the light emitted therefrom. Cavity 50 permits the positioning of light element 52 so that the element does not interfere with the grip of a user. It also directs light emitted from the element and protects the element from damage.

As noted above, elastomeric members 14 and light element 52 are retained in the radial direction by bar 18. They may be slidably inserted and removed, however, via one or both of end faces 42 (FIG. 3). As shown in FIG. 3, bar 18, including elastomeric members 20 and light element 52, is retained by end caps 56 of brackets 12, thereby retaining the elastomeric members and the light element longitudinally within the bar. Brackets 12 are secured to a wall of the vehicle by trunk sections 58.

Light element 52 is illustrated in FIG. 3 as a single longitudinal element extending the length of bar 18. It should be understood, however, that other configurations are possible, for example including multiple lights disposed along the longitudinal length of the bar. Light element 52 includes a plug device at either end that is received by one or both of the end caps 56. As shown in FIGS. 1 and 3, electricity is provided through the end cap by an external cord 22.

Figure 5:
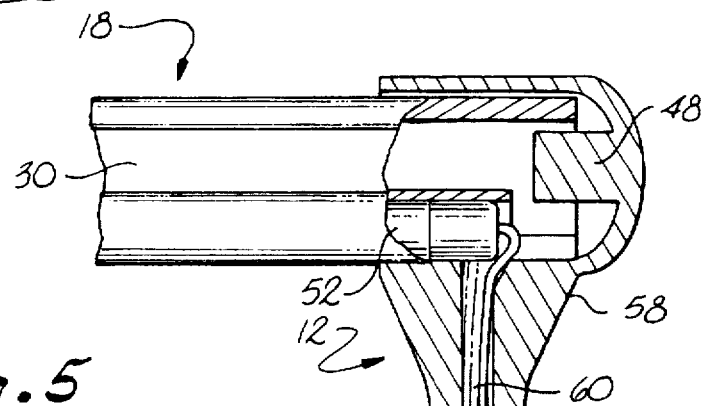
FIG. 5 is a cross-sectional view of the mounting member of the hand rail assembly of FIG. 4 taken along the lines 5—5.

In another preferred embodiment as shown in FIGS. 4 and 5, however, electricity is provided to the light element by internal wiring 60 extending through trunk section 58 of one of the brackets 12. Wiring 60 may be connected to the electrical system of vehicle 16 (FIG. 1). However, an independent battery source, for example a battery, may also be provided.

While preferred embodiments of the invention have been described above, it is to be understood that any and all equivalent realizations of the present invention are included within the scope and spirit thereof. For example, the gripping and lighting sections need not be entirely discrete, and portions of these sections may alternate with one another. Furthermore, the shaped key may be formed as part of the bar that is received by a corresponding opening in the bracket. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

What is claimed is:

1. A vehicle hand rail assembly, said hand rail assembly comprising:
   an elongated bar, a first section of said bar defining a gripping area and a second section of said bar defining a longitudinal cavity configured to longitudinally slidably receive and radially retain at least one light element longitudinally disposed along said bar so that the light element is easily removable from said elongated bar; and at least one mounting member securing said bar in position with respect to a surface of the vehicle.

2. The hand rail assembly as in claim 1, wherein said first section defines two longitudinal said gripping areas disposed parallel to each other.

3. The hand rail assembly as in claim 1, wherein said first section includes an elastomeric member forming said gripping area and a second cavity configured to receive and retain said elastomeric member.

4. The hand rail assembly as in claim 3, wherein said second cavity includes a pair of parallel longitudinal grooves, each said parallel groove defining a restricted longitudinal opening and wherein said elastomeric member includes an outer gripping surface forming an outer surface of said bar and a pair of parallel flanges extending radially inward from said outer gripping surface, each said flange being received by a respective one of said parallel grooves so that said restricted openings inhibit removal of said flange in a radial direction.

5. The hand rail assembly as in claim 1, wherein said bar defines a generally circular cross section.

6. The hand rail assembly as in claim 1, wherein said bar is positionable in a rotational position so that light emitted from said light element is directed toward the vehicle surface.

7. The hand rail assembly as in claim 1, wherein said bar includes an extruded metal base portion.

8. The hand rail assembly as in claim 1, wherein said second section is configured to receive and retain a single elongated said light element.

9. The hand rail assembly as in claim 8, wherein said second section includes a single said longitudinal cavity configured to slidably receive said elongated light element from at least one longitudinal end of said bar and to retain said light element in a radial direction within said longitudinal cavity.

10. The hand rail assembly as in claim 1, including two said mounting members, each said mounting member attached to said bar at a respective longitudinal end thereof.

11. The hand rail assembly as in claim 10, wherein each said mounting member includes an end cap receiving its said respective longitudinal end and a trunk section attached at one end to said end cap and at an opposite end to the vehicle surface.

12. The hand rail assembly as in claim 11, wherein one of said mounting members is configured to receive wires through said end cap to energize said light element.

13. The hand rail assembly as in claim 11, wherein one of said mounting members is configured to receive wires through said trunk section to energize said light element.

14. The hand rail assembly as in claim 3, wherein said first section includes two said second cavities receiving and retaining respective said elastomeric members, and wherein said second section includes a said longitudinal cavity configured to slidably receive an elongated said light element, wherein said two second cavities and said longitudinal cavity are disposed symmetrically about said bar.

15. The hand rail assembly as in claim 1, wherein said bar is configured with said at least one mounting member so that said bar is selectively positionable in a plurality of rotational positions.

16. The hand rail assembly as in claim 10, wherein each longitudinal end of said bar defines an end cavity configured to receive an end key from a respective said mounting member, said end keys and said end cavities being configured to cooperatively retain said bar in at least one rotational position.

17. The hand rail assembly as in claim 16, wherein each said key is triangular shaped and wherein said end cavities are configured to receive a respective said key so that said end cavities and said keys cooperate to retain said bar in three selectable rotational positions.

18. The hand rail assembly as in claim 16, wherein said end cavities are part of a central cavity extending through the length of said bar.

19. A vehicle hand rail assembly, said assembly comprising:

an elongated bar;

at least one longitudinal first cavity defined on the surface of said bar;

at least one elongated light element longitudinally slidably received by and radially retained in said first cavity so that the light element is easily removable from said elongated bar;

at least one longitudinal second cavity defined on the surface of said bar;

an elastomeric grip received by and retained in said second cavity; and two mounting members, each said mounting member disposed proximate a respective longitudinal end of said bar and attached at one end to said respective longitudinal end of said bar and at an opposite end to a vehicle surface.

20. The hand rail assembly as in claim 19, wherein said mounting members are configured to retain said bar so that said bar is parallel to the vehicle surface.

21. The hand rail assembly as in claim 20, including two said second cavities receiving respective said elastomeric grips and one said first cavity, said second cavities and said first cavity symmetrically disposed about said bar, and wherein said bar is attached to said mounting members so that said bar is positionable in three rotational positions.

22. A vehicle hand rail assembly, said assembly comprising:

an elongated bar;

a longitudinal first cavity defined on the surface of said bar;

an elongated light element longitudinally slidably received by and radially retained in said first cavity so that the light element is easily removable from said elongated bar;

two longitudinal second cavities defined on the surface of said bar, each said second cavity including a pair of parallel longitudinal grooves, each said parallel groove defining a restricted longitudinal opening;

two elastomeric grips, each said grip received by a corresponding said second cavity and including an outer gripping, surface forming an outer surface of said bar and a pair of parallel flanges extending radially inward from said outer gripping surface, each said flange being received by a respective one of said parallel grooves so that said restricted openings inhibit removal of said flange in a radial direction; and two mounting members, each said mounting member disposed proximate a respective longitudinal end of said bar and attached at one end to said respective longitudinal end of said bar and at an opposite end to a vehicle surface, wherein said mounting members are configured with said bar so that said bar is positionable so that light from said light element is directed to the vehicle surface.

* * * * *